UNITED STATES PATENT OFFICE 2,692,796

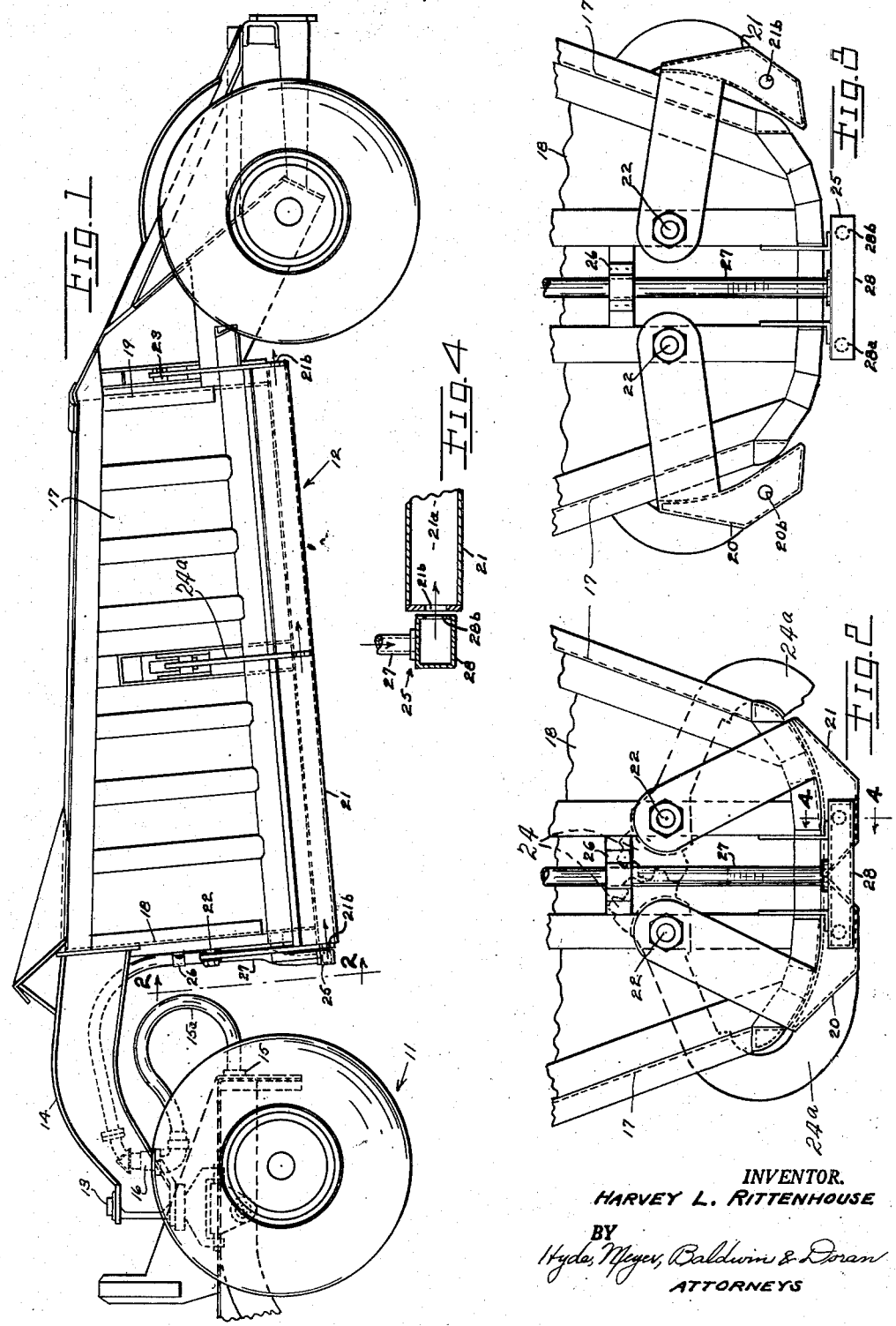

HEATING MEANS FOR DUMP BODY DOORS

Harvey L. Rittenhouse, Cleveland Heights, Ohio, assignor, by mesne assignments, to General Motors Corporation, Detroit, Mich., a corporation of Delaware Application November 13, 1951, Serial No. 256,076

3 Claims. (Cl. 298—35)

This invention relates to improvements in doors and more particularly to heated doors for dump bodies or wagons for operation in sub-freezing weather.

One of the objects of the present invention is to provide in a door for a dump body of the type described a hot gas conveying means associated with the door to prevent freezing of the moisture in the dump body load during sub-freezing weather.

Other features of this invention reside in the arrangement and design of the parts for carrying out their appropriate function.

Other objects and advantages of this invention will be apparent from the accompanying drawings and description and the essential features will be set forth in the appended claims.

In the drawings,

Fig. 1 is a side elevational view of a bottom dump body or wagon having the heated doors of this invention and being attached to a propelling vehicle;

Fig. 2 is an end view of the dump wagon taken along the line 2—2 of Fig. 1 and showing the doors in their closed position;

Fig. 3 is a view similar to Fig. 2 but showing the doors in their open position; while Fig. 4 is a vertical sectional view taken along the line 4—4 of Fig. 2.

While this invention might be adapted to various types of vehicles or dump bodies, the drawings disclose it applied to a conventional type of bottom dump body or wagon. The propelling vehicle is indicated generally at 11. This vehicle may be a tractor or any other type of prime mover. The bottom dump body or wagon 12 has a draw bar 14 pivotally attached to the vehicle by a hitch 13. The hot gas for heating the doors might be provided from any source on the prime mover but I prefer to use exhaust gases from the vehicle motor, here an internal combustion engine, emerging from the exhaust pipe 15. A flexible conduit 15a connects the exhaust pipe of the vehicle to the dump body 12 having the doors to be heated. The conduit includes a coupling 16 forming a swivel connection in the conduit so that the section attached to the exhaust pipe may swivel with respect to the section attached to the bottom dump wagon. The axis of coupling 16 is parallel to the vertical pivot of hitch 13. This swivel permits 90 degree turning between tractor 11 and trailer wagon 12 while maintaining the exhaust pipe connection.

The bottom dump body or wagon 12 has an open top for loading. It is mounted on wheels and pivotally attached to the propelling vehicle as a semi-trailer. The downwardly inclined side walls 17 and the side or end walls 18 and 19 form the sides of the dump body to enclose and support the load. Bottom dump doors 20 and 21 are pivotally mounted at 22 and 23 on side walls 18 and 19 respectively. The pivots 22 and 23 provide pivotal door mountings extending in a fore-and-aft direction. These doors are movable laterally across the bottom opening of the dump body between open and closed positions. In the closed position, the doors extend under the opening, as shown in Fig. 2; in the open position, the doors are swung laterally outwardly beyond the edges of the bottom opening of the dump body, as shown in Fig. 3.

Means may be provided for interconnecting the doors for relative simultaneous movement between the open and closed positions. This means may take the form of the gear segments 27 disclosed in the copending application of Stewart F. Armington on "Clam Shell Door Construction," Serial No. 241,431, filed August 11, 1951. The drawings in the present application have these denoted as rotatably mounted gear segments 24, 24 in Fig. 2 with each connected by an arm 24a, located midway along the length of dump body 12, to its respective bottom dump door 20 or 21.

The doors 20 and 21 are fabricated from steel plates, cut to size, formed, and then welded together. The doors 20 and 21 respectively have hollowed out portions or cavities 20a and 21a extending throughout their length and being formed between the top and bottom plates of each door. These cavities 20a and 21a are open at both ends as shown by apertures 20b and 21b respectively.

Means is provided for conveying hot gases to the cavity in each door for supplying the heat thereto. After the hot exhaust gases emerge from the exhaust pipe 15, they are carried through the flexible conduit 15a with the swivel coupling 16 to the inverted T-shaped hot gas conduit 25 attached to the side wall 18 by the bracket 26. The vertical stem 27 of the T is located in a vertical plane substantially equal distance from the doors 20 and 21 and is attached to the central portion of the cross bar 28 of the T. The cross bar of the T or manifold overlies the ends of each door in closed position, as seen in Fig. 2, and has ports or apertures 28a and 28b near to its outer ends and alignable respectively with apertures 20b and 21b in the leading edges of the doors when they are in their closed position in Fig. 2. Hot exhaust gases flow from the exhaust pipe 15, through the flexible conduit 15a into the hollow T-shaped conduit 25, through the apertures 28a and 20b and apertures 28b and 21b into the longitudinal cavities in the respective doors, and then through the apertures 20b and 21b at the rear of the doors (at the right in Fig. 1) into the atmosphere.

When the doors are in their open position shown in Fig. 3, they no longer receive the hot exhaust gases from the T-shaped conduit. Instead, the hot gases emerging from apertures 28a and 28b are carried upwardly by the natural convection of the air into the load in the dump body to aid in the thawing of any frozen masses therein.

These heated bottom doors of the dump body or wagon are ideally suited for use in sub-freezing weather. Normally, the moisture in the load in the dump body or wagon will freeze and form a bridge between the downwardly inclined side walls 17 of a dumping wagon of this type. This bridge prevents easy dumping of the load because it blocks the free, downward flow of the material from the wagon. In this invention, the hot exahust gases being conveyed through the load supporting bottom dump doors of the dump body or wagon prevent the moisture from freezing and insure easy, unobstructed load dumping under all weather conditions. The heated, bottom doors of this invention may be either used alone with a wagon as disclosed herein or used with a bottom dump wagon having heated side walls, as disclosed in the copending application of Harvey L. Rittenhouse on "Exhaust Heating Semi-Trailer Bodies," Serial No. 226,687, filed May 16, 1951.

Various changes in detail and arrangement of parts can be made by one skilled in the art without departing from the spirit of this invention or the scope of the appended claims.

What I claim is:

1. In combination, a bottom dump body having opposite side walls and a bottom dump opening, a pair of doors, each door being pivotally mounted on said walls, said doors being movable between a closed position wherein both of said doors are under said opening and an open position wherein both of said doors are swung laterally outwardly beyond the edges of said opening, means interconnecting said doors for relative simultaneous movement between said positions, a hot gas conveying manifold attached to one of said side walls and overlying the end of each door, said manifold having spaced ports, one port facing each door, each door having a cavity extending under substantially the entire load supporting surface of each door, and each said cavity having an opening aligned with one of said ports when the doors are in closed position, whereby the hot gases circulate through the cavities in the doors to heat them during sub-freezing weather and for preventing the freezing of any moisture in the dump body load, the forming of a bridge in the load and to promote the easy dumping of the load.

2. In a load hauling machine, a propelling vehicle having a hot exhaust gas pipe, a dump body attached to said propelling vehicle, said dump body having a door movable between open and closed positions, said door having a cavity open at both ends, a conduit connected to said exhaust pipe and alignable with one open end of said cavity at least when said door is in said closed position, whereby the hot gases circulate through the door cavity to heat it during sub-freezing weather and for preventing the freeezing of any moisture in the dump body load, the forming of a bridge in the load and to promote the easy dumping of the load.

3. In a load hauling machine, a propelling vehicle having a hot exhaust gas pipe, a bottom dump body pivotally attached to said propelling vehicle as a semi-trailer, said bottom dump body having opposite side walls and a bottom dump opening, a pair of doors, each door being pivotally mounted on said walls, said doors being movable between a closed position wherein both of said doors are undersaid opening and an open position wherein both of said doors are swung laterally outwardly beyond the edges of said opening, means interconnecting said doors for relative simultaneous movement between said positions, a hot gas conveying manifold attached to one of said side walls and overlying the end of each door, a flexible conduit connected to said exhaust pipe and the manifold, said manifold having spaced ports, one port facing each door, each door having a cavity aligned with one of said ports when the doors are in closed position, whereby the hot gases circulate through the cavities in the doors to heat them during sub-freezing weather and for preventing the freezing of any moisture in the dump body load, the forming of a bridge in the load and to promote the easy dumping of the load.

References Cited in the file of this patent

UNITED STATES PATENTS

| Number | Name | Date |
|--------|------|------|
| 873,187 | Taylor et al. | Dec. 10, 1907 |
| 2,494,472 | De Saussure | Jan. 10, 1950 |